United States Patent
Grimm et al.

[11] Patent Number: 5,470,515
[45] Date of Patent: Nov. 28, 1995

[54] ROTATIONAL MOLDING PROCESS FOR INSULATING PIPES

[75] Inventors: Wolfgang Grimm, Leverkusen; Norbert Eisen; Hans-Dieter Ruprecht, both of Köln, all of Germany

[73] Assignee: Bayer Aktiengesellschaft, Leverkusen, Germany

[21] Appl. No.: 157,063
[22] PCT Filed: May 26, 1992
[86] PCT No.: PCT/EP92/01183
  § 371 Date: Dec. 3, 1993
  § 102(e) Date: Dec. 3, 1993
[87] PCT Pub. No.: WO92/21910
  PCT Pub. Date: Dec. 10, 1992

[30] Foreign Application Priority Data

Jun. 5, 1991 [DE] Germany .......................... 41 18 362.2

[51] Int. Cl.[6] .................... B29C 44/20; B29C 44/32
[52] U.S. Cl. ................ 264/45.7; 264/46.9; 264/255
[58] Field of Search ................. 264/45.7, 46.9, 264/46.7, 255

[56] References Cited

U.S. PATENT DOCUMENTS

| | | | |
|---|---|---|---|
| 2,474,660 | 6/1949 | Fitzpatrick | 264/45.7 |
| 3,366,718 | 1/1968 | Komada | 264/45.7 |
| 3,733,382 | 5/1973 | Van Dijk | 264/45.7 |
| 3,797,981 | 3/1974 | Van Dijk | 264/45.7 |
| 4,485,057 | 11/1984 | Kristensson | 264/46.7 |
| 4,689,003 | 8/1987 | Schreiner et al. | 425/224 |
| 4,758,397 | 7/1988 | Schreiner et al. | 264/166 |
| 5,096,933 | 3/1992 | Volkert | 521/131 |
| 5,141,968 | 8/1992 | Dietrich et al. | 521/167 |

FOREIGN PATENT DOCUMENTS

| | | | |
|---|---|---|---|
| 440490 | 9/1973 | Australia . | |
| 2138917 | 2/1973 | Germany | 264/45.7 |
| 56-095656 | 8/1981 | Japan | 264/45.7 |
| 58-031724 | 2/1983 | Japan | 264/45.7 |
| 1181672 | 2/1970 | United Kingdom . | |
| 2046865 | 11/1980 | United Kingdom . | |

OTHER PUBLICATIONS

Patent Abstracts of Japan, vol. 7, No. 248 (C–193) Nov. 4, 1983 & JP,A,58134108.

*Primary Examiner*—Allan R. Kuhns
*Attorney, Agent, or Firm*—Joseph C. Gil

[57] ABSTRACT

For insulating pipes by application of at least one insulating layer and at least one outer surface layer by rotational molding, a rigid polyurethane foam is used as the insulating layer while a solid polyurethane is used as the surface layer.

10 Claims, No Drawings

ROTATIONAL MOLDING PROCESS FOR INSULATING PIPES

The coating of pipes by application of several solid plastic layers by rotational molding is known (cf. EP-A 166 245).

The present invention relates to a process for insulating pipes. In the process according to the invention, a specially developed rigid polyurethane foam is used as the insulating layer while a specially developed solid polyurethane, more particularly an elastomeric polyurethane, is used as the surface layer.

At the present time, two processes are widely used, namely:

A: Spraying of the rigid foam layer and separate application of a surface layer to the rotating pipe.
  Disadvantages:
  1. heavy spraying losses (up to 50%)
  2. repeated handling of the pipe B: In-mold foaming with an outer pipe of polyethylene
  Disadvantages:
  1. uneven distribution of density over long pipes because of the long flow paths
  2. heat breaks through spacers.

The present invention avoids the disadvantages mentioned above.

Another advantage of the process according to the invention lies in its flexibility of application to pipes of various diameters with individual layers of variable thickness. Adaptation of the formulations of the solid polyurethane surface layer and the rigid polyurethane foam to the particular dimensions of the pipe in conjunction with variation of the machine parameters provides for any desired setting.

The present invention relates to a process for isolating pipes by application of at least one insulating layer and at least one outer surface layer by rotational molding, characterized in that a rigid polyurethane foam is used as the insulating layer while a solid polyurethane is used as the surface layer.

In a preferred embodiment of the invention,
  the rigid polyurethane foam is obtainable by reaction of
  a) an aromatic polyisocyanate with
  b) a polyol component bearing on average at least 3 isocyanate-reactive hydrogen atoms and containing
    1. a polyether containing at least two hydroxyl groups and having a molecular weight of 300 to 700
    2. an aliphatic, cycloaliphatic or aromatic polyamine having a molecular weight of 32 to 1,000 as crosslinking agent and
    3. a blowing agent and
    4. optionally a polyether containing tertiary amino groups and having a molecular weight of 200 to 700 and
    5. optionally a compound containing at least three hydroxyl groups and having a molecular weight of 62 to 299 as chain-extending or crosslinking agent and
    6. optionally auxiliaries and additives,
  a mixture of diphenyl methane diisocyanate and polyphenyl polymethylene polyisocyanates (crude MDI) is used as the aromatic polyisocyanate,
  water is used as the blowing agent,
  the polyol component additionally contains a hydrophobicizing agent,
  the solid polyurethane is obtainable by reaction of a) an NCO-terminated prepolymer having an NCO content of 5 to 20% obtainable by reaction of
    1. 4,4'-diphenyl methane diisocyanate, optionally in admixture with 2,4'- and 2,2'-isomers and 0 to 30% by weight components of higher functionality with
    2. polyethers containing 2 to 4 OH groups and having a molecular weight of 1,000 to 6,000 to which up to 30% by weight of a hydrophobicizing agent, preferably castor oil, has optionally been added
  with
  b) a polyol component containing
    1. a polyether containing 2 to 4 isocyanate-reactive hydrogen atoms and having a molecular weight of 1,000 to 6,000,
    2. 5 to 35% by weight of an aromatic diamine having a molecular weight of 122 to 400,
    3. 0 to 5% by weight of an aliphatic or cycloaliphatic diamine having a molecular weight of 60 to 400,
    4. 0 to 30% by weight of a hydrophobicizing agent and
    5. optionally auxiliaries and additives,
  the polyol component contains diethyl tolylenediamine as the aromatic diamine,
  the rigid polyurethane foam layer and the outer protective layer of solid polyurethane are applied in a single operation,
  the outer protective layer of solid polyurethane is applied before the rigid polyurethane foam layer develops its final strength and
  the rigid polyurethane foam layer and the outer layer of solid polyurethane are applied by means of mixing heads and casting nozzles, either the mixing heads being advanced at defined intervals parallel to the axis of rotation of the pipe or the pipe being axially advanced at a defined speed under fixedly positioned mixing heads.

The following starting components are used for the production of the rigid polyurethane foams:

Polyisocyanates of the type described, for example, by W. Siefken in Justus Liebigs Annalen der Chemie, 562, pages 75 to 136, for example those corresponding to the following formula

$$Q(NCO)_n$$

in which
  n=2–4, preferably 2, and
  Q is an aromatic hydrocarbon radical containing 6 to 15 and preferably 6 to 13 carbon atoms,
for example polyisocyanates of the type described in DE-OS 28 32 253, pages 10–11.

In general, it is particularly preferred to use the commercially readily obtainable polyisocyanates, for example 2,4- and 2,6-tolylene diisocyanate and mixtures of these isomers (TDI), mixtures of diphenyl methane diisocyanate and polyphenyl polymethylene polyisocyanates of the type obtained by phosgenation of aniline/formaldehyde condensates ("crude MDI") and polyisocyanates containing carbodiimide groups, urethane groups, allophanate groups, isocyanurate groups, urea groups or biuret groups ("modified polyisocyanates").

These polyisocyanates are reacted with the polyol component defined more closely hereinafter.

The polyol component contains (50 to 90% by weight) of a (short-chain) polyether containing at least two hydroxyl groups and having a molecular weight of 300 to 700 which has been produced by addition of propylene oxide and/or ethylene oxide onto starters, such as sorbitol, ethylene glycol, trimethylol propane, glycerol, pentaerythritol and/or sugar. The polyol component preferably has an OH value of 300 to 600.

In addition, the polyol component contains (0.5 to 20% by weight) an aliphatic, cycloaliphatic or aromatic polyamine having a molecular weight of 32 to 1,000 as cross-linking agent, for example tetraethylene pentamine, hexamethylenediamine or diethyl tolylenediamine.

In addition, a hydrophobicizing agent, preferably castor oil, may be present in quantities of 0 to 30% by weight.

The blowing agent (known per se), preferably water, is also present in the polyol component (generally in a quantity of 0.5 to 10% by weight).

In addition to water which is preferably used and which releases $CO_2$ by reaction with isocyanates, suitable blowing agents are readily volatile organic compounds for example perhalogenated and partly halogenated hydrocarbons which boil at $-50°$ C. to $+75°$ C. and preferably at $+10°$ C. to $+35°$ C. under a pressure of 1013 mbar, such as trichlorofluoromethane (R11), 1,1-dichloro-2,2,2-trifluoroethane (R123), 1,1-dichloro-1-fluoroethane (R141b), dichlorofluoromethane (R11), 1-chloro-1,1-difluoroethane (R142b), 1,1,1,2-tetrafluoroethane (R134a), and aliphatic or cycloaliphatic $C_{3-6}$ hydrocarbons such as, for example, propane, butane, pentane and isopentane.

Finally, it also contains (in a quantity of 0 to 30% by weight) a polyether bearing tertiary amino groups and having a molecular weight of 200 to 700 which has been obtained by addition of ethylene oxide and/or propylene oxide onto triethanolamine, diisopropanolamine or ethylenediamine for example. It preferably has an OH value of 250 to 700.

Compounds containing at least three hydroxyl groups and having a molecular weight of 32 to 299, which serve as chain-extending agents or crosslinking agents, may also be present in the polyol component. Examples of such compounds can be found in DE-OS 28 32 253, pages 19–20.

Auxiliaries and additives, such as emulsifiers and foam stabilizers, may also be used. Suitable emulsifiers are those based on alkoxylated fatty acids and higher alcohols.

Suitable foam stabilizers are, above all, polyether siloxanes, particularly water-insoluble types. These compounds are generally synthesized in such a way that a copolymer of ethylene oxide and propylene oxide is attached to a polydimethyl siloxane unit. Water-soluble foam stabilizers are described, for example, in U.S. Pat. Nos. 2,834,748, 2,917,480 and 3,629,308.

The polyol component may also contain reaction retarders, for example substances showing an acidic reaction, such as hydrochloric acid or organic acid halides, cell regulators known per se, such as paraffins or fatty alcohols or dimethyl polysiloxanes, pigments or dyes, stabilizers against the effects of ageing and weathering, plasticizers, fungistatic and bacteriostatic agents and fillers, such as barium sulfate, kieselguhr, carbon black or whiting.

Further examples of optional surface-active additives and foam stabilizers, cell regulators, reaction retarders, stabilizers, flameproofing agents, plasticizers, dyes, fillers, fungistatic and bacteriostatic agents and information on their use and their mode of action can be found in Kunststoff-Handbuch, Vol. VII, edited by Vieweg & Höchtlen, Carl-Hanser-Verlag, München 1966, for example on pages 103 to 113.

According to the invention, catalysts known per se from polyurethane chemistry, such as tertiary amines and/or organometallic compounds, may also be present in the polyol component.

After the liquid reaction mixture forming the rigid polyurethane foam has been applied to the pipe to be insulated by rotational molding, the liquid reaction mixture forming the solid polyurethane, as defined above, is applied, preferably in a single operation, advantageously before the rigid polyurethane foam layer has developed its final strength, i.e. about 1 to 10 minutes after its application, i.e. the reaction mixture forming the surface layer is preferably applied 1 to 10 minutes after application of the rigid polyurethane foam layer.

The individual components of the reaction mixture forming the solid polyurethane are known per se.

Castor oil is preferably used as the hydrophobicizing agent. Suitable auxiliaries and additives in this regard correspond in principle to the compounds already mentioned.

Examples of the polyether containing 2 to 4 isocyanate-reactive hydrogen atoms and having a molecular weight of 1,000 to 6,000, which is present both in the polyol component and (in reacted form) in the prepolymer component of the reaction mixture forming the solid polyurethane, are compounds containing amino groups, thiol groups or carboxyl groups, but preferably hydroxyl groups, for example polyethers containing 2 to 4 hydroxyl groups of the type known per se for the production of polyurethanes and described, for example, in DE-OS 28 32 253, pages 11–18. This polyether is present in the polyol mixture in a quantity of 95 to 30% by weight. Also included are dispersions of polyether-containing hydroxyl compounds of relatively high molecular weight which have been obtained by reaction of mono- and/or polyisocyanates with polyamines and/or hydrazines and/or hydrazides and/or alkanolamines containing primary and/or secondary amino groups in a compound containing 2 to 4 primary and/or secondary hydroxyl groups and having a molecular weight of 1,000 to 4,000. Dispersions such as these of relatively high molecular weight, polymer-containing hydroxyl compounds are known, for example, from DE-OS 25 19 004, DE-OS 25 50 796, DE-OS 2 5 50 797, DE-OS 25 50 960, DE-OS 25 50 833, DE-OS 25 50 862, DE-OS 26 38 759, DE-OS 26 39 254, U.S. Pat. No. 4,374,209, EP-A 0 079 115 and U.S. Pat. No. 4,381,351.

Polymer-modified polyols obtained by grafting of monomers containing double bonds, such as styrene and/or acrylonitrile, onto polyols may of course also be used.

Aromatic diamines having a molecular weight of 122 to 400 may be used and include, for example, tolylenediamine, 4,4'-diaminodiphenyl methane, 3,5-diethyl-2,4-tolylenediamine (DETDA).

Examples of aliphatic and cycloaliphatic diamines having a molecular weight of 60 to 400 are ethylenediamine, isophoronediamine, 1,4-diaminocyclohexane.

Description of the process according to the invention:

A pipe is rotated at a certain speed, depending on its diameter, in a suitable machine. Depending on the required thickness of the insulating layer, the reaction mixture forming the rigid foam is applied to the pipe through a slot die at a defined rate of advance of the mixing head. Various nozzle geometries, preferably slot dies, have to be used for various outputs. Once the rigid foam has reached its insulating thickness, casting of the surface layer is started in the same operation. The two mixing heads for the rigid foam and the surface layer may be advanced at the same speeds or at different speeds where the rotating pipe is clamped in the machine.

In cases where the rotating pipe is moved longitudinally, the mixing heads have to be fixedly positioned at predetermined intervals.

The output of the reaction mixtures for the rigid foam and the surface layer is best adjusted so that the same rate of advance is obtained for both mixing heads (see diagram of the process). Corresponding nozzle geometries, preferably slot dies, are also used for the casting of the surface layer.

Example:

| | | |
|---|---|---|
| Pipe diameter | 620 mm | |
| Pipe speed | 23.8 r.p.m. | |
| Output of rigid foam mixture | 5,000 g/min. | |
| Output of surface layer mixture | 6,400 g/min. | |
| Rate of advance of mixing head for rigid foam | 406 mm/min. | |
| Rate of advance of mixing head for surface layer | 240 mm/min. | |
| Insulating thickness | 80 mm | |
| Surface layer thickness | 11 mm | |
| Interval between mixing heads | 1400 mm | |

Rigid foam formulation:

| | |
|---|---|
| 45 parts by weight | sugar-started polyether with propylene oxide, OHV 450, NW 350 |
| 45 parts by weight | sorbitol/glycerol-started polyether with propylene oxide, OHV 450, MW 570 |
| 5 parts by weight | glycerol |
| 1.5 parts by weight | H₂O |
| 1 part by weight | Schaumstabilisator B 8423 (Goldschmidt) |
| 2.5 parts by weight | tetraethylenepentamine |
| 1.3 parts by weight | pentamethylene diethylenetriamine |
| 160.0 parts by weight | crude MDI (NCO content 31.8% by weight), index 110 |

Formulation of the solid polyurethane:

| | |
|---|---|
| 79 parts by weight | polyether (SAN graft polymer), MW 4500 |
| 19.5 parts by weight | diethyl tolylenediamine |
| 1.5 parts by weight | hexamethylenediamine |
| 131.0 parts by weight | MDI polyether prepolymer (NCO content: 10.5% by weight) |
| 128 parts by weight | prepolymer to 100 parts polyol (index 113) |

Formulation of prepolymer:

| | |
|---|---|
| 41% | isocyanate mixture of<br>70% 4,4'-MDI<br>20% 2,4'-MDI<br>10% MDI, functionality ≧3 |
| 59% | polyether of 1,2-propylene glycol and propylene oxide, MW 2000 |

We claim:

1. A process for insulating a pipe comprising:
   i) applying at least one insulating layer to said pipe by rotational molding, wherein the insulating layer is a rigid polyurethane foam-forming liquid reaction mixture comprising:
      a) a mixture of diphenyl methane diisocyanate and polyphenyl polymethylene polyisocyanates,
      b) a polyol component bearing on average at least isocyanate-reactive hydrogen atoms and containing
         1) a polyether containing at least two hydroxyl groups and having a molecular weight of from 300 to 700,
         2) an aliphatic, cycloaliphatic or aromatic polyamine having a molecular weight of from 32 to 1000 as crosslinking agent, and
         3) a blowing agent,
   ii) allowing said reaction mixture to foam to reach its insulating thickness,
   iii) applying at least one solid polyurethane-forming liquid reaction mixture to said insulating layer by rotational molding, said solid polyurethane-forming reaction mixture containing no blowing agent, and comprising:
      a) an NCO-terminated prepolymer having an NCO content of from 5 to 20% by weight and being prepared by reacting:
         1) 4,4'-diphenyl methane diisocyanate with
         2) polyethers containing 2 to 4 OH groups and having molecular weights of from 1000 to 6000,
      b) a polyol component containing:
         1) a polyether containing 2 to 4 isocyanate-reactive hydrogen atoms and having a molecular weight of from 1000 to 6000, and
         2) 5 to 35% by weight of an aromatic diamine having a molecular weight of from 122 to 400.

2. The process of claim 1, wherein both of said reaction mixtures are applied in a single operation.

3. The process of claim 2, wherein said solid polyurethane-forming reaction mixture is applied before said insulating layer has developed its final strength.

4. The process of claim 1, wherein both of said reaction mixtures are applied by means of mixing heads and casting nozzles, wherein either the mixing heads are advanced at defined intervals parallel to the axis of rotation or the pipe is axially advanced at a defined speed under fixedly positioned mixing heads.

5. The process of claim 1, wherein said blowing agent i)b)3) is water.

6. The process of claim 1, wherein said polyol component i)b) contains a hydrophobicizing agent.

7. The process of claim 1, wherein said aromatic diamine iii)b)2) is diethyl tolylenediamine.

8. The process of claim 1, wherein said 4,4,'-diphenyl methane diisocyanate ill)a)1) is used in admixture with 2,4'- and 2,2'-isomers and from 0 to 30% by weight of oligomers thereof having higher functionalities.

9. The process of claim 8, wherein said polyethers iii)a)2) contains up to 30% by weight of a hydrophobicizing agent.

10. The process of claim 9, wherein said polyol component iii)b) also contains from 0 to 5% by weight of an aliphatic or cycloaliphatic diamine having a molecular weight of from 60 to 400 and from 0 to 30% by weight of a hydrophobicizing agent.

* * * * *